United States Patent [19]

Yamamoto et al.

[11] Patent Number: 5,465,695
[45] Date of Patent: Nov. 14, 1995

[54] IGNITION SYSTEM FOR INTERNAL COMBUSTION ENGINE

[75] Inventors: Hiroyuki Yamamoto; Noriyuki Ota; Toshiyuki Terashita, all of Yokohama, Japan

[73] Assignee: Mazda Motor Corporation, Hiroshima, Japan

[21] Appl. No.: 268,875

[22] Filed: Jun. 30, 1994

Related U.S. Application Data

[63] Continuation of Ser. No. 936,397, Aug. 31, 1992, abandoned.

[30] Foreign Application Priority Data

Aug. 30, 1991 [JP] Japan .................................. 3-245233
Aug. 30, 1991 [JP] Japan .................................. 3-245234

[51] Int. Cl.⁶ .......................... F02B 19/12; F02P 15/02
[52] U.S. Cl. ................................... 123/256; 123/310
[58] Field of Search ............................. 123/310, 638, 123/625, 670, 256, 308, 309

[56] References Cited

U.S. PATENT DOCUMENTS

| | | | |
|---|---|---|---|
| 1,580,353 | 4/1926 | Vincent | 123/638 |
| 2,338,959 | 1/1944 | Nallinger et al. | 123/310 |
| 2,481,890 | 9/1949 | Toews | 123/310 |
| 4,011,841 | 3/1977 | Sato et al. | 123/310 |
| 4,036,187 | 7/1977 | Ting | 123/310 |
| 4,202,306 | 5/1980 | Nakajima et al. | 123/310 |
| 4,530,340 | 7/1985 | Totman | 123/670 |
| 5,261,367 | 11/1993 | Yamamoto et al. | 123/309 |

FOREIGN PATENT DOCUMENTS

| | | | |
|---|---|---|---|
| 4001819 | 7/1991 | Germany . | |
| 57-148021 | 9/1982 | Japan . | |
| 59-180067 | 10/1984 | Japan | 123/310 |

*Primary Examiner*—Andrew M. Dolinar
*Attorney, Agent, or Firm*—Keck, Mahin & Cate

[57] ABSTRACT

An ignition system for an internal combustion engine has a plurality of peripheral ignition gaps arranged at appropriate separations along the periphery of a combustion chamber and a center ignition gap disposed at a center of the combustion chamber. The ignition gaps are selectively used according to engine operating conditions so that only the peripheral ignition gaps produce sparks when the engine operates under low engine loads and the center ignition gap and the peripheral ignition gaps all produce sparks at once when the engine operates under high engine loads.

4 Claims, 16 Drawing Sheets

IGNITION SYSTEM FOR INTERNAL COMBUSTION ENGINE

This is a continuation of application Ser. No. 07/936,397, filed Aug. 31, 1992, abandoned.

BACKGROUND OF THE INVENTION

1. Field of the Invention

The present invention relates to a multi-point ignition system for an internal combustion engine for an automobile engine.

2. Description of Related Art

Multi-point ignition systems for automobile engines have a plurality of ignition spark gaps in each cylinder. In order to arrange a plurality of peripheral ignition spark gaps along an inner wall of a combustion chamber of each cylinder at appropriate circumferential separations, a plurality of spark plugs may be supported by an annular supporting ring. Such an annular supporting ring is disposed between a cylinder block and a cylinder head. Simultaneous fuel ignition by providing a spark across each of the plurality of peripheral ignition spark gaps causes rapid fuel combustion so as to realize ideal "iso-volume" combustion, particularly for Otto cycle engines. Such an ignition system is known from, for instance, Japanese Unexamined Patent Publication No. 57-148,021.

It has recently been attempted to provide an ignition spark gap at the center of a combustion chamber in addition to a plurality of peripheral ignition spark gaps. In order to optimize fuel combustion, these ignition spark gaps are selectively used to ignite fuel in different ignition modes; such ignition modes may include a first ignition mode and a second ignition mode.

When an engine operates under lower loads, the first ignition mode, in which only the peripheral ignition spark gaps are used to ignite fuel, is selected so as to cause sufficient fuel combustion along the inner wall of the combustion chamber. This suppresses increases in hydrocarbon (HC) which are produced easily in a peripheral area of the combustion chamber. Additionally, flame expansion in an early stage of fuel combustion is suppressed. Suppressing flame expansion lowers a peak speed of fuel combustion and leads to provision of a uniform combustion ratio throughout the combustion chamber during the entire period of combustion. This, in turn, results in a decrease in emission of nitrogen oxides (NOx). On the other hand, when the engine operates under higher loads, the second ignition mode, in which all of the ignition spark gaps are used at once to ignite fuel, is selected. This second ignition mode prevents the occurrence of engine knocking.

When considering both the relative placement of intake and exhaust ports and spark plug service efficiency, it is difficult to arrange the peripheral ignition spark gaps at equal circumferential separations. Having peripheral ignition spark gaps at unequal circumferential separations may produce a delay in what is known as "flame fusion" near part of the combustion chamber between adjacent peripheral ignition spark gaps having a separation larger than those of other adjacent peripheral ignition spark gaps. Such a delay in flame fusion is undesirable from the standpoint of providing sufficiently decreased hydrocarbon (HC) and nitrogen oxide (NOx) emissions.

SUMMARY OF THE INVENTION

It is one object of the present invention to provide an ignition system for an automobile engine which can effectively prevent knocking in the automobile engine from being caused when ignition spark gaps are used all at once to fire fuel.

It is another object of the present invention to provide an ignition system for an automobile engine which can cause flame fusion simultaneously throughout a combustion chamber and, in particular, along the inner wall of a combustion chamber, even if peripheral ignition spark gaps are arranged at unequal circumferential separations.

These objects are accomplished by providing a particular ignition system for an internal combustion engine having a plurality of combustion chambers. Each of the combustion chambers is defined by a generally cylindrical inner wall and formed with two intake ports, arranged on one side of a center line passing through a center of the combustion chamber, and two exhaust ports, arranged on another side of the center line. The ignition system has a plurality of peripheral ignition gaps arranged at circumferential separations along the inner wall of the combustion chamber and a center ignition spark gap disposed at a center of the combustion chamber. These ignition spark gaps are selectively switched between a first ignition mode and a second ignition mode according to engine operating conditions. Specifically, only the peripheral ignition spark gaps are activated to produce sparks in the first ignition mode when the engine operates under low engine loads, while the center ignition spark gap and the peripheral ignition spark gaps are activated together to produce sparks in the second ignition mode. In the second ignition mode, the center ignition spark gap is activated to produce a spark later than any of the peripheral ignition spark gaps.

The ignition system of the present invention causes flame propagation to occur over a relatively short distance. This prevents engine knocking. Activating the center ignition gap later than the peripheral ignition spark gaps reduces the quantity of unburned gas remaining around the periphery of the combustion chamber, and prevents engine knocking from occurring even more effectively.

BRIEF DESCRIPTION OF THE DRAWINGS

The above and other objects and various features of the invention will be apparent to those skilled in the art from the following description of preferred embodiments when considered in conjunction with the drawings. In the drawings, the same reference numerals have been used to denote the same or similar elements throughout.

DESCRIPTION OF THE PREFERRED EMBODIMENTS

Figure 1:
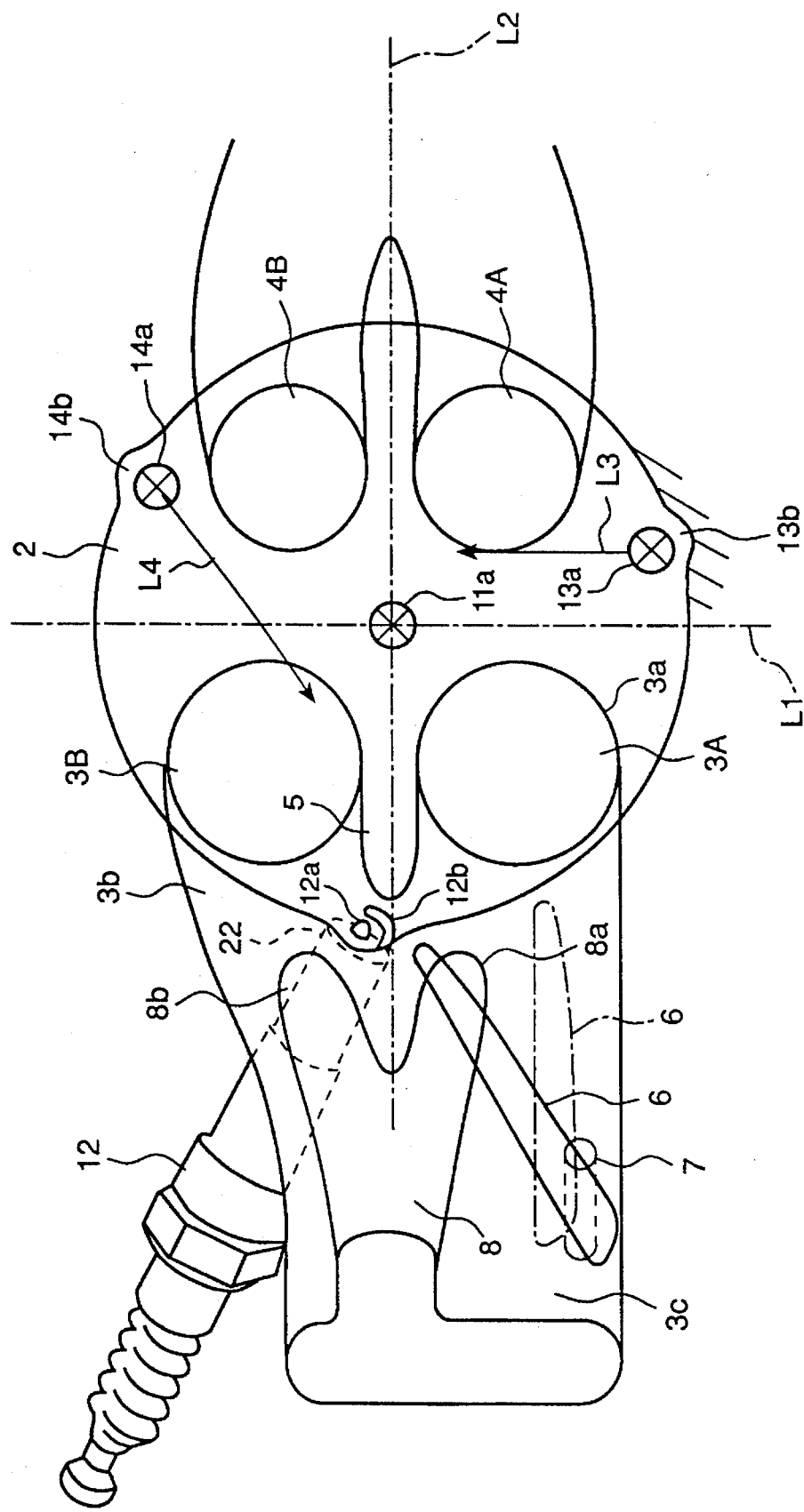
FIG. 1 is a schematic illustration showing an ignition spark gap arrangement in a combustion chamber of an internal combustion engine in which an ignition system in accordance with a preferred embodiment of the present invention is realized.

FIG. 1 shows a cylinder head of an internal combustion engine, which is of a cross-flow type, as having a plurality of combustion chambers 2 (one of which is shown). The cylinder head 1 is formed with two intake ports 3A and 3B and two exhaust ports 4A and 4B for each combustion chamber 2. These intake ports 3A and 3B and exhaust ports 4A and 4B, opening into the combustion chamber 2, are opened and closed at a desired timing by intake valves and exhaust valves (not shown), respectively, in a well known manner. The intake ports 3A and 3B are located on one and the same side with respect to a lengthwise center line L1, passing through the center of the combustion chamber 2, which is parallel to an axis of rotation of an engine crankshaft. The intake ports are arranged side by side in the direction of the rotational axis of the crankshaft. Similarly, both of the exhaust ports 4A and 4B are located on an opposite side with respect to the lengthwise center line L1 and are arranged side by side in the direction of the rotational axis of the crankshaft.

The intake ports 3A and 3B are merged together through their downstream individual portions 3a and 3b so as to form a common upstream portion 3c. These downstream individual portions 3a and 3b, in practice, are defined by providing a partition wall 5 in a downstream portion of the common portion 3c. The intake port 3A extends in a straight line from the upstream common portion 3c to the downstream individual portion 3a in a direction perpendicular to the lengthwise center line L1. On the other hand, the intake port 3B merges with the upstream common portion 3c after the downstream individual portion 3b has curved. In more detail, the partition wall 5 is located on a transverse center line L2, passing through the center of the combustion chamber 2, which is perpendicular to the lengthwise center line L1. The intake port 3A is offset by the curved downstream individual portion 3B toward the intake port 3A.

In the upstream common portion 3c of the intake ports 3A and 3B, a swirl valve 6 is pivoted by a pivot shaft 7 for swinging movement between a fully closed position, shown by a rigid line, in which the downstream individual portion 3a of the intake port 3A is closed, and a fully opened position, shown by a dotted chain line, in which the downstream individual portion 3a of the intake port 3A is opened. The free end of the swirl valve 6 is placed so as to face an upstream side end of the partition wall 5 with a small clearance when it is in the closed position. On the other hand, the swirl valve 6 is almost parallel with to the downstream individual portion 3a when it is in the open position. In this embodiment, the swirl valve is fully closed while the engine operates under relatively low loads, gradually opened with an increase in load while the engine operates under middle range loads, and fully opened while the engine operates under relatively high loads.

The upstream common portion 3c is partly expanded so as to form a chamber 8 for a fuel injector having two injection nozzles 9. The chamber 8 is divided, at its downstream portion, into two guide channels; such guide channels may, for example, include a guide channel 8a extending toward the intake port 3A and a guide channel 8b extending toward the intake port 3B. The fuel injector injects and directs fuel toward the guide channels 8a and 8b through the two injection nozzles, respectively. The fuel injector may be of a single nozzle type if it injects fuel widely enough, i.e., over an area sufficiently large to cover the guide channels 8a and 8b.

When the swirl valve 6 is in its fully closed position, a major portion of intake air is introduced into the combustion chamber 2 through the intake port 3B only. This forms a swirl-flow in a clockwise direction as viewed in FIG. 1. As the swirl valve 6 gradually opens, the swirl-flow is gradually weakened. Since a small portion of the intake air is introduced into the combustion chamber 2 through the intake port 3A even while the swirl valve 6 is in its fully closed position, fuel is prevented from adhering to an inner surface of the downstream individual portion 3a. However, even when the swirl valve is kept in its fully opened position, the intake port 3B causes at least some swirl-flow through the curved downstream individual portion 3b.

In the combustion chamber 2, four ignition spark gaps 11a, 12a, 13a and 14a are provided. The ignition spark gap 11a is located at the center of the combustion chamber 2 and is hereafter referred to as a center ignition spark gap. The remaining ignition spark gaps 12a, 13a and 14a are arranged along the periphery of the combustion chamber 2 at almost equal angular separations and are hereafter referred to as peripheral ignition spark gaps. One of the peripheral ignition spark gaps 12a, 13a and 14a, for instance, the peripheral ignition spark gap 12a, is located below the upstream end of the partition wall 5 between the intake ports 3A and 3B. The other peripheral ignition spark gaps 13a and 14a are located on a side remote from the periphery ignition spark gap 12a with respect to the lengthwise center line L1. Both of the peripheral ignition spark gaps 13a and 14a are closer to the adjacent exhaust ports 4A and 4B, respectively, than to the lengthwise center line L1. The peripheral ignition spark gap 13a is closer to the lengthwise center line L2 than the peripheral ignition spark gap 14a. The arrangement of the peripheral ignition spark gaps 12a, 13a and 14a is intended and designed so as to satisfy, or satisfy as closely as possible, a fuel burning condition so that if fuel is ignited by the peripheral ignition spark gaps 12a, 13a and 14a only, flames fuse together initially along the wall of the combustion chamber 2 and then at the center of the combustion chamber 2.

A plug fitting bore 22, in which a spark plug 12 with the ignition spark gap 12a is mounted, is formed in the cylinder head 1 below the intake ports 3A and 3B. The plug fitting bore is inclined with respect to the lengthwise center line L2 so as to locate an end opening of the plug fitting bore 22, opening to the outside of the cylinder head 1, more closely to the intake port 3B than to the lengthwise center line L2. This allows the spark plug 12 to be fitted to the cylinder head 1 from the side on which the intake port 3B is offset, without being blocked by the intake ports 3A and 3B and their associated intake pipes (not shown). The partition wall 5, from which the plug fitting bore 22 extends away, can be made thin, so as to reduce resistance to intake air.

Figure 2:
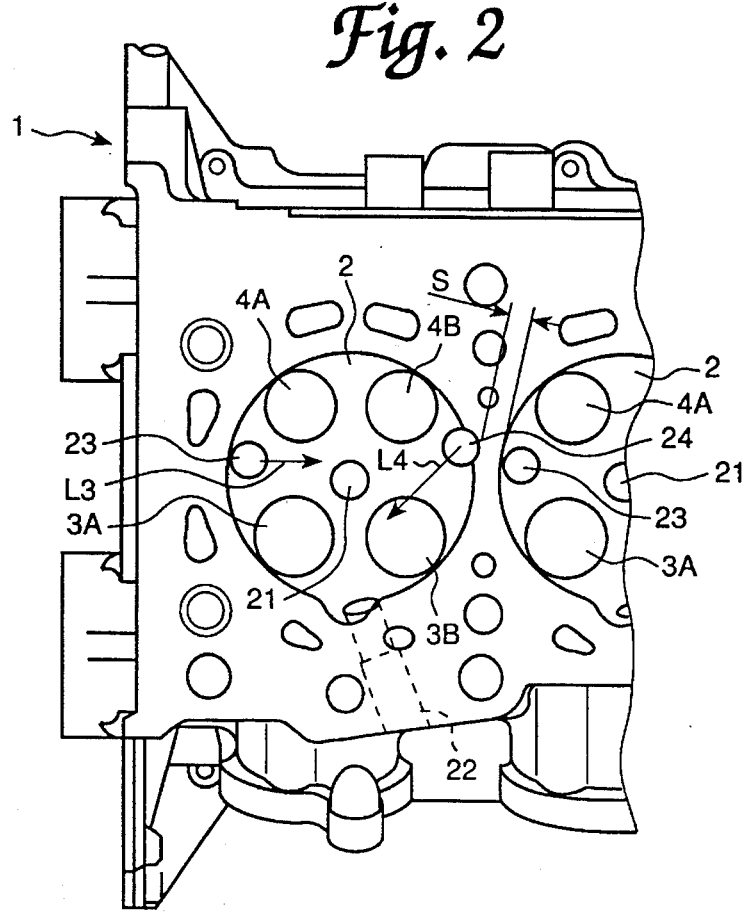
FIG. 2 is a bottom view of part of a cylinder head having the ignition spark gap arrangement of FIG. 1.
Figure 3:
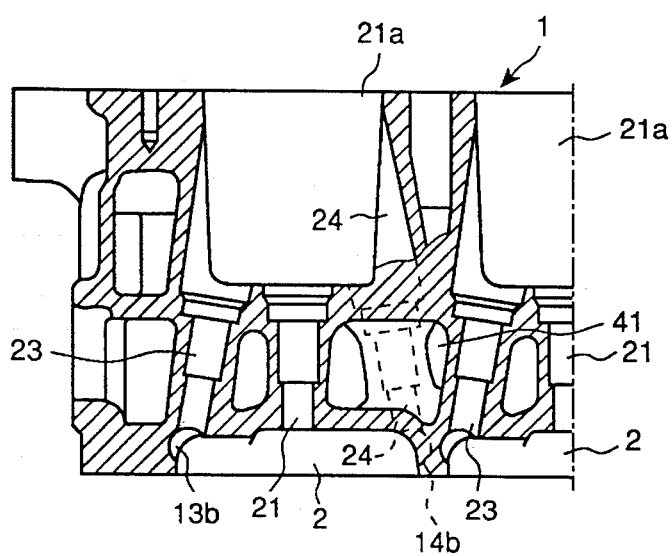
FIG. 3 is a side view of the part shown in FIG. 2.

Referring to FIGS. 2 and 3, a center plug fitting bore 21, in which a spark plug (not shown) with a center ignition spark gap 11a is provided, is formed in the cylinder head 1 along a center axis of the combustion chamber 2 so as to open to the top face of the cylinder head 1. The center plug fitting bore 21 has an upper bore portion 21a defined by a wall inclined at an angle with respect to the lengthwise center line L1. The center plug fitting bore 21 is formed so as to have a cross-sectional area larger than a maximum cross-sectional area of the spark plug and an opening slightly larger than the maximum cross-sectional area of a spark plug. A peripheral plug fitting bore 23, in which the a spark plug (not shown) with the peripheral ignition spark gap 13a is provided, is formed in the cylinder head 1 so as to open to the top face of the cylinder head 1. The peripheral plug fitting bore 23 has a top opening which opens into the upper bore portion 21a of the center plug fitting bore 21. Similarly, a peripheral plug fitting bore 24, in which the a spark plug (not shown) with the peripheral ignition spark gap 14a is provided, is formed in the cylinder head 1 so as to open to the top face of the cylinder head 1. The peripheral plug fitting bore 24 has a top which opens into the upper bore portion 21a of the center plug fitting bore 21. In such a way, the peripheral plug fitting bores 23 and 24 are inclined with respect to the center plug fitting bore 21. The plug fitting bores 21, 23 and 24 are formed with internal threads on their lower portions below the upper bore portion 21a so as to engage the spark plugs.

The peripheral plug fitting bore 23 inclines in a direction indicated by an arrow L3 (shown in FIGS. 1 and 2) in a vertical plane parallel to the lengthwise center line L1. The peripheral plug fitting bore 24 inclines, in a direction shown by an arrow L4 (shown in FIGS. 1 and 2), in a vertical plane intersecting the lengthwise center line L1 at an angle. The peripheral spark plugs are fitted in respective peripheral plug fitting bores 23 so as to place the peripheral ignition spark gaps 12a, 13a and 14a in generally semi-spherically-shaped plug holes 12b, 13b and 14b formed in the inner wall of the combustion chamber 2. In order to avoid accidentally scratching the inner wall surface of the combustion chamber 2 and to leave a sufficient width of a separation (indicated by a reference character "S" in FIG. 2) between two adjacent cylinder bores, it is desirable to form the semi-spherically-shaped plug holes 12b–14b by, for instance, a drill oriented obliquely upward relative to the inner wall from the center of the combustion chamber 2 and from the under side of the cylinder head 1, as shown by arrows in FIG. 3. Inclining the peripheral plug fitting bores 23 and 24 relative to the center plug fitting bore 21 allows a separation between peripheral plug fitting bores 23 and 24 for adjacent cylinder bores to be sufficiently big as to form a cooling water passage 41 with a large cross-sectional area, as shown in FIG. 3.

Figure 5:
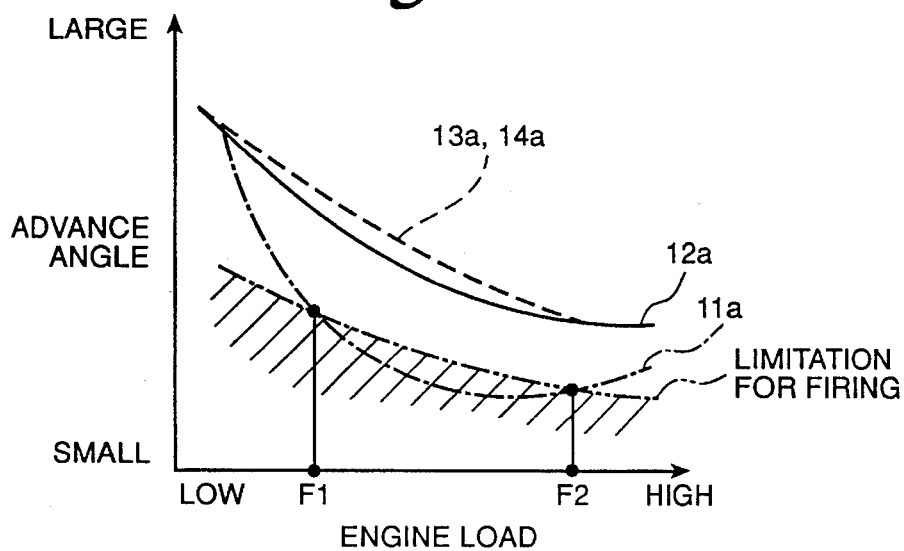
FIG. 5 is a diagram showing a relation between ignition timing and engine load.

Engine operating conditions determine which ignition spark gaps of the four ignition spark gaps 11a, 12a, 13a and 14a are used to ignite fuel introduced into the combustion chamber 2. That is, as shown in FIG. 5, engine loads are divided into three ranges for different ignition modes. These ranges include a first ignition mode, in which only the peripheral ignition spark gaps 12a, 13a and 14a are used to ignite fuel, and a second ignition mode, in which all of the center and peripheral ignition spark gaps 11a, 12a, 13a and 14a are used to ignite fuel. A middle range of engine loads is defined between specific lower and higher engine loads F1 and F2 for the first ignition mode. For the second ignition mode, a low range of engine loads is defined below the specific lower engine load F1. Also, for the second ignition mode, a higher range of engine loads is defined above the specific higher engine load F2.

In the second ignition mode, the center ignition spark gap 11a is ignited or sparked after the peripheral ignition spark gaps 12a, 13a and 14a. However, if the engine load is fairly low, all of the ignition spark gaps 11a, 12a, 13a and 14a are simultaneously sparked for certain ignition. Except for exceptionally low and high engine loads, the peripheral ignition spark gap 12a is ignited or sparked after the remaining peripheral ignition spark gaps 13a and 14a. This reflects consideration of the fact that the fuel mixture around the peripheral ignition spark gap 12a sometimes becomes relatively rich. Consequently, flames provided by sparking the peripheral ignition spark gap 12 tend to propagate, or grow, faster than flames caused by the peripheral ignition spark gaps 13a and 14a. In the middle range of engine loads for the first ignition mode, however, only the peripheral ignition spark gaps 12a, 13a and 14a are sparked. Therefore, fuel is sufficiently burned along the inner wall of the combustion chamber 2, so as to reduce hydrocarbon (HC) emission. Flames caused by the peripheral ignition spark gaps 12a, 13a and 14a initially fuse together with each other in a circumferential direction of the combustion chamber 2 and, thereafter, at the center of the combustion chamber 2. Consequently, a speed at which the flames grow is suppressed, i,e., a peak speed of combustion is suppressed, so as to provide a uniform combustion ratio throughout the combustion chamber 2 during the entire period of combustion. This results in a decrease in nitrogen oxide (NOx) emission. In the higher range of engine loads, the ignition spark gaps 11a, 12a, 13a and 14a are all used to ignite fuel, so as to accelerate a speed at which flames propagate to various parts in the combustion chamber 2. This prevents the occurrence of engine knocking. In the range of higher engine loads, because ignition of the center ignition spark gap 11a is retarded relative to that of any of the peripheral ignition spark gaps 12a, 13a and 14a, the amount of unburned gas is reduced in the combustion chamber 2 along the inner wall, so as to prevent the occurrence of engine knocking more efficiently.

Figure 6:
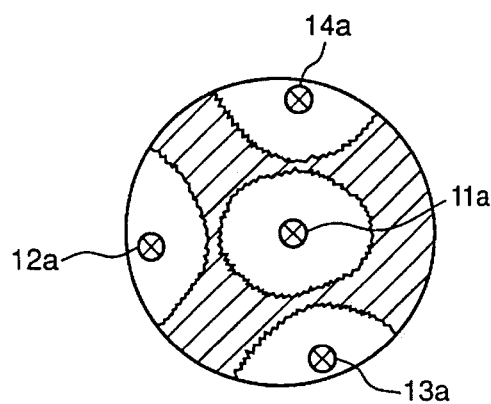
FIG. 6 is an explanatory illustration of fuel combustion when sparks are provided in all ignition spark gaps at once.
Figure 7:
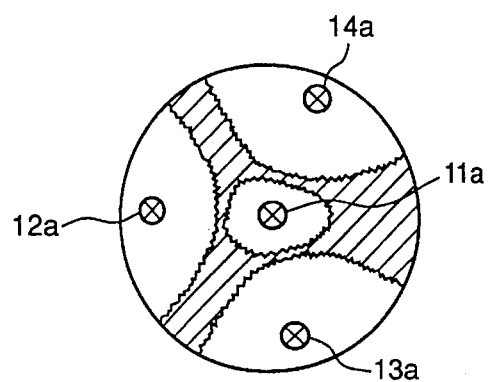
FIG. 7 is an explanatory illustration of fuel combustion when a center ignition spark gap is ignited after peripheral ignition spark gaps in accordance with the present invention.

The flame propagation shown in FIG. 7, which is caused by the ignition system according to the present invention, can be best understood by comparison of an example shown in FIG. 6, which shows flame propagation if the ignition spark gaps 11a–14a are all sparked at once in the higher range of engine loads. In FIGS. 6 and 7, the shaded parts indicate regions in which unburned gas stay, while unshaded parts indicate regions in which gas has burned. As is apparent from a comparison the flame propagations, unburned gas is quantitatively reduced along the inner wall of the combustion chamber 2 more in a system according to the present invention than in the example.

To realize a balance between ensured ignition and a decrease in quantity of unburned gas, sparking of the center ignition spark gap 11a is retarded relative to sparking of the peripheral ignition spark gaps 12a, 13a and 14a even in the low range of engine loads, excepting under very low engine loads.

Figure 4:
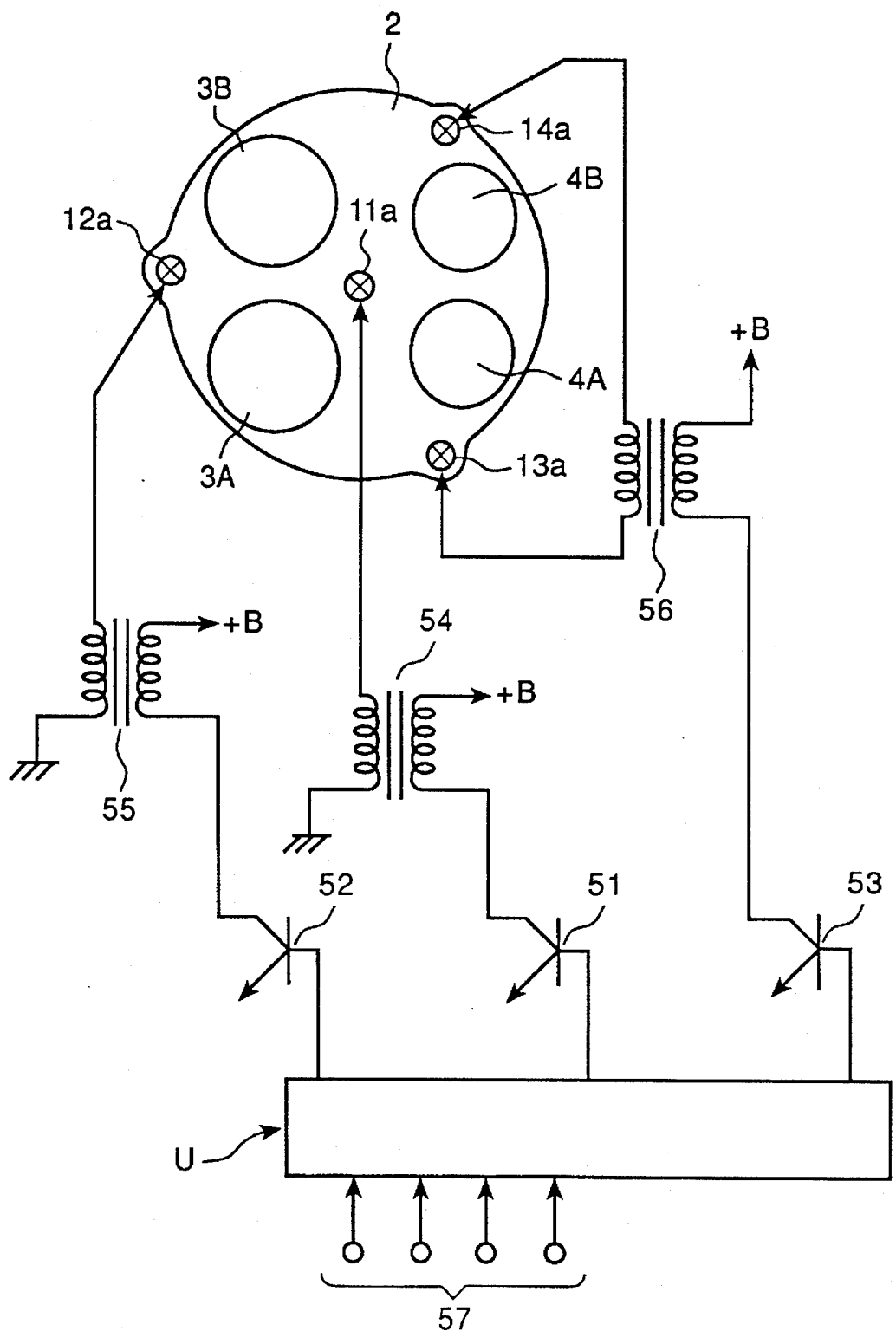
FIG. 4 is a schematic diagram showing an ignition system.

FIG. 4 shows an ignition system which includes a control unit (U) formed mainly by a microcomputer. The ignition system also includes igniters, shown as switching transistors 51, 52 and 53, and ignition coils 54, 55 and 56. The ignition coils 54, 55 and 56 are, respectively, assigned to the center spark plug having the center ignition spark gap 11a, the spark plug having the peripheral ignition spark gap 12a, and the spark plugs having the peripheral ignition spark gaps 13a and 14a, respectively. Since each of the ignition coils 54 and 55 is assigned to only a single ignition spark gap, it has a secondary winding with a positive terminal connected to a high voltage terminal of the spark plug. On the other hand, in the ignition coil 56, which is assigned to two ignition spark gaps, a secondary winding with a positive terminal is connected to a high voltage terminal of one of the two spark plugs and a negative terminal is connected to a high voltage terminal of the other of the two spark plugs. Such wiring reduces the necessary number of parts, such as ignition coils and igniters. For correct ignition timing, the control unit (U) receives various signals from various sensors 57, such as an engine speed sensor, an intake air or engine load sensor, an engine coolant temperature sensor, and an intake air temperature sensor.

Figure 8:
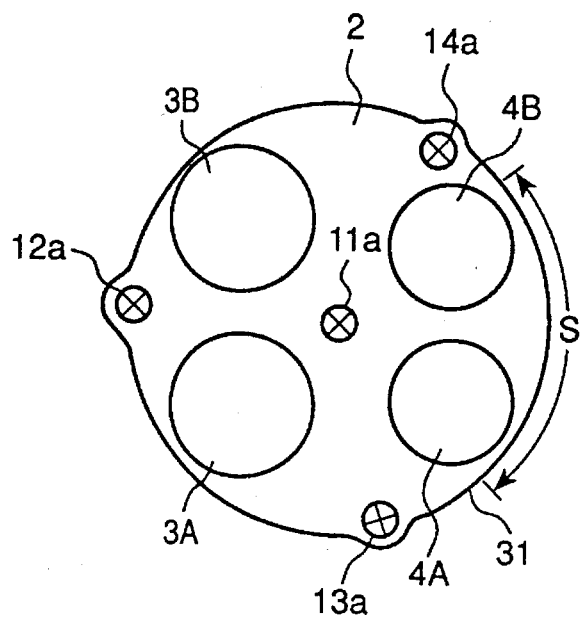
FIG. 8 is an explanatory illustration showing a combustion chamber having a catalytic oxidation coating layer.

As shown in FIG. 8, in order to reduce hydrocarbon (HC) emissions, it is effective to apply a catalytic oxidation coating layer 31, which enhances fuel combustion, to a section "S" of the inner surface of the combustion chamber 2 defined between the peripheral ignition spark gaps 13a and 14a which are located at the greatest separation relative to each other. In the combustion chamber 2 with the catalytic oxidation coating layer 31, the speed of flame growth is almost identical among the respective sections defined between the adjacent ignition spark gaps 12a and 13a, 12a and 14a, and 13a and 14a if all the peripheral ignition spark gaps 12a, 13a and 14a are sparked at once. As was previously described, when fuel is ignited by the peripheral ignition spark gaps 12a, 13a and 14a only, flames fuse together initially along the wall of the combustion chamber 2 at almost the same time between the respective sections. Thereafter, the flames fuse together at the center of the combustion chamber 2. In addition to greatly reducing hydrocarbon (HC) emissions, such combustion progression suppresses a peak combustion speed and, consequently, provides a uniform combustion ratio throughout the combustion chamber 2 during the entire period of combustion. This decreases the emissions nitrogen oxides (NOx). The catalytic oxidation coating layer 31 may be applied to part of a cylinder block or part of a piston corresponding to the section "S" of the inner surface of the combustion chamber 2.

Figure 9:
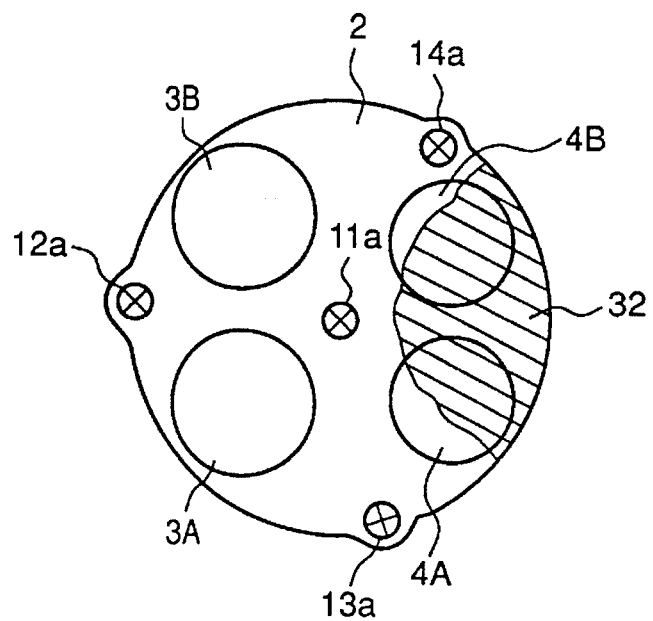
FIG. 9 is an explanatory illustration showing fuel distribution in a combustion chamber.

As shown in FIG. 9, in order to hasten flame propagation over a specific volume 32 defined between the peripheral ignition spark gaps 13a and 14a, which are the spark gaps located at the greatest separation relative to each other, it is effective to enrich the fuel mixture delivered toward the specific volume 32 more than the fuel mixture delivered toward the remaining volume. To partially enrich the fuel mixture, the fuel injector is installed so as to inject and direct fuel toward the specific volume 32 when the intake ports are almost fully opened.

Figure 10:
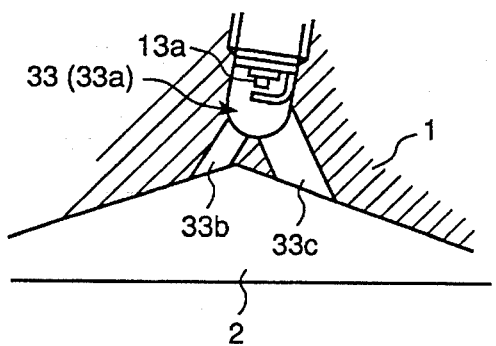
FIG. 10 is a cross-sectional view of another cylinder head arrangement according to the present invention.
Figure 11:
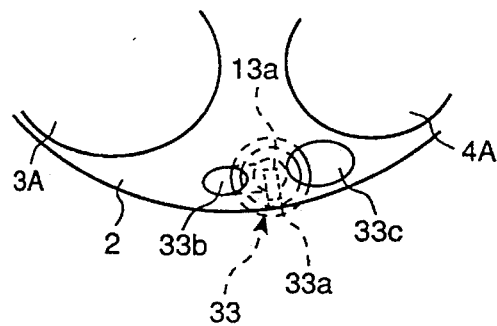
FIG. 11 is a bottom view of the cylinder head arrangement shown in FIG. 10.

FIGS. 10 and 11 show a cylinder head in accordance with another preferred embodiment of the present invention. In this embodiment, plug fitting bores are modified so that a flame caused by either of the peripheral ignition spark gaps 13a and 14a grows mainly towards a flame caused by the other of the peripheral ignition spark gaps 13a and 14a. Considering, for example, the peripheral ignition spark gap 13a, a plug fitting bore 33, formed in the cylinder head 1, has an upper bore portion 33a, in which the peripheral ignition spark gap 13a is placed, and two communication bore portions 33b and 33c, through which the upper bore portion 33a communicates with the combustion chamber 2. A flame produced in the upper bore portion 33a is sprayed into the combustion chamber 2 through the communication bore portions 33b and 33c. The communication bore portion 33b is oriented in a tangential direction with respect to the inner surface of the combustion chamber 2 so as to direct a flame towards the peripheral ignition spark gap 12a. The communication bore portion 33c is oriented in a tangential direction with respect to the inner surface of the combustion chamber 2 so as to direct a flame toward the peripheral ignition spark gap 14a. The communication bore portion 33c has a cross-sectional area considerably larger than that of the communication bore portion 33b. As a result, a flame produced by the peripheral ignition spark gap 13a grows toward the peripheral ignition spark gap 14a at a speed which is higher than the speed at which the flame grows toward the peripheral ignition spark gap 12a. Consequently, flame propagation is accelerated between the peripheral ignition spark gaps 13a and 14a. A plug fitting bore is formed with the same geometry for the peripheral ignition spark gap 14a as that of the plug fitting bore for the peripheral ignition spark gap 13a. It is, of course, possible to have a communication bore directed toward the peripheral ignition spark gap 13a be formed with a cross-sectional area which is larger than that of a communication bore portion directed toward the peripheral ignition spark gap 12a. Such a plug fitting bore, having two communication bore portions, may be provided for either of the peripheral ignition spark gaps 13a and 14a.

Figure 12:
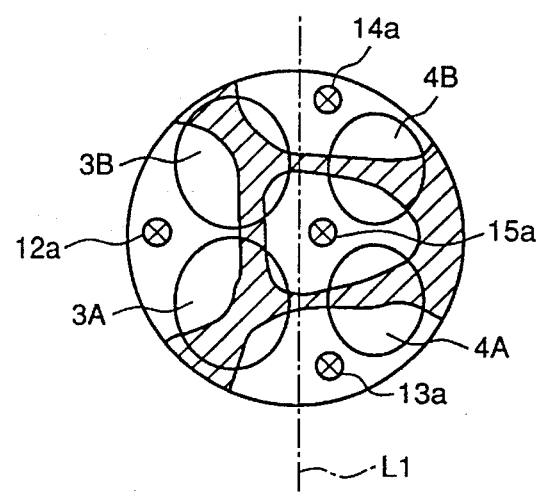
FIG. 12 is a schematic illustration showing another ignition spark gap arrangement.

FIG. 12 shows another ignition spark gap arrangement. In this arrangement, a center ignition spark gap is assigned as a firing or ignition hastening means. In this ignition spark gap arrangement, a center ignition spark gap 15a, rather than the center ignition spark gap 11a in FIG. 1, is located near the center of the combustion chamber 2, but is offset toward the exhaust ports 4A and 4B with respect to the center of the combustion chamber 2. Although the center ignition spark gap 11a located at the center of the combustion chamber 2 was not always used to ignite fuel, the center ignition spark gap 15a, by contrast, is always used to ignite fuel. The ignition spark gap 15a, because it is offset from the center of the combustion chamber 2, enhances flame propagation between the peripheral ignition spark gaps 13a and 14a, as shown in FIG. 12. In FIG. 12, the volume of the combustion chamber containing unburned fuel is shaded, while the volume of the combustion chamber containing burned fuel area is plain.

Figure 13:
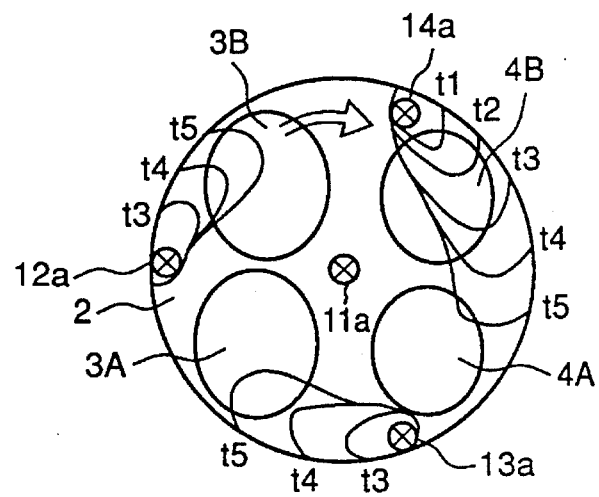
FIG. 13 is an illustration showing growth of flames in a swirl flow of intake air.
Figure 14:
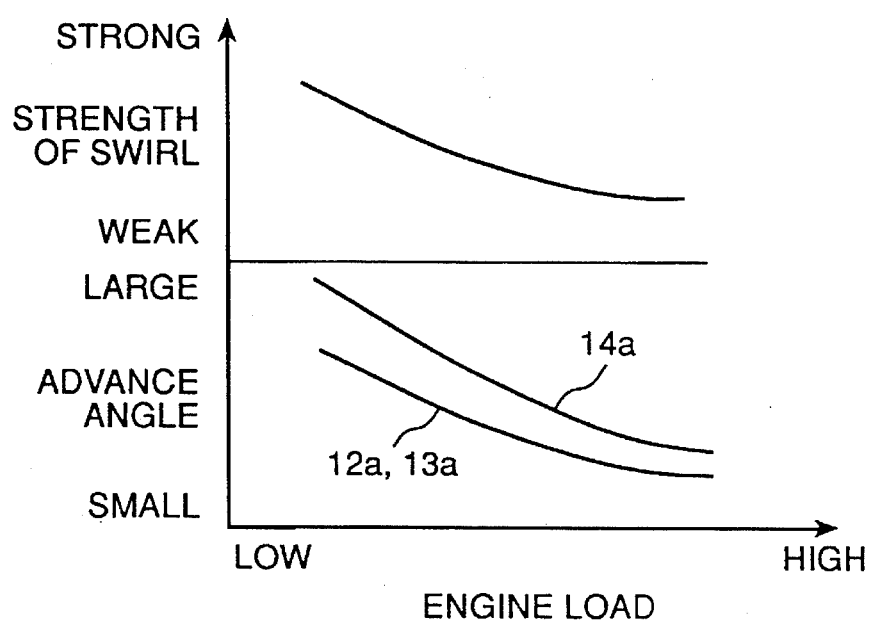
FIG. 14 is a diagram showing the relation between the strength of a swirl flow of intake air and ignition timing.

FIGS. 13 and 14 show a swirl flow of intake air which is used to enhance flame propagation between the peripheral ignition spark gaps 13a and 14a. A swirl flow of intake air is introduced into the combustion chamber 2 so that it swirls in a clockwise direction, as indicated by an arrow in FIG. 13. The peripheral ignition spark gap 14a, which is upstream of the peripheral ignition spark gap 13a with respect to the swirl flow of intake air, is adjusted to spark earlier than the peripheral ignition spark gaps 12a and 13a.

The propagation of a flame is shown by times t1 to t5, in numerical order, in FIG. 13. As FIG. 13 shows, a flame generated by the peripheral ignition spark gap 14a is influenced by the swirl flow of intake air and grows toward the peripheral ignition spark gap 13a. With a slight delay, the peripheral ignition spark gaps 12a and 13a are ignited and make the flame grow. Finally, fusion of flames along the inner surface of the combustion chamber 2 occurs between the peripheral ignition spark gaps 12a and 13a, between the peripheral ignition spark gaps 12a and 14a, and between the peripheral ignition spark gaps 13a and 14a all at once.

The relation between the strength of intake air swirl flow and ignition timings of the respective peripheral ignition spark gaps 12a, 13a and 14a is shown in FIG. 14. Generally, as an engine load decreases, the peripheral ignition spark gap 14a is sparked earlier than the peripheral ignition spark gaps 12a and 13a.

The ignition spark gap arrangements shown in FIGS. 1 to 12 do not always need to be subjected to the effects of intake air swirl flow.

Figure 15:
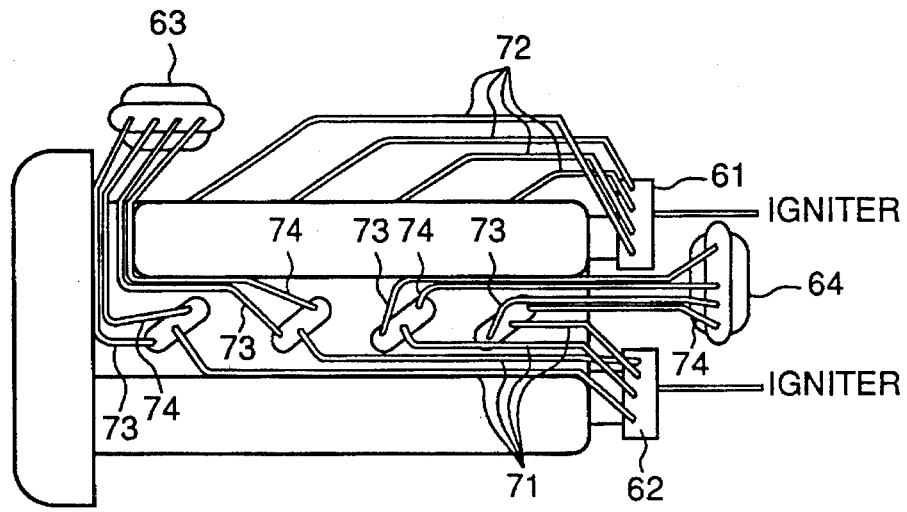
FIG. 15 is an illustration of high tension wiring for the ignition spark gap arrangement shown in FIG. 1.

FIG. 15 shows high tension wiring of the ignition system for an in-line, four cylinder engine. In this arrangement, distributors 61 and 62 and ignition coils 63 and 64 are provided. The high tension wires are designated by reference numbers 71–74 for the ignition spark gaps 11a–14a, respectively. The distributer 61 is assigned to the peripheral ignition spark gap 12a of each of the four cylinders, and the distributer 62 is assigned to the center ignition spark gap 11a of each of the four cylinders. The ignition coil 63 is assigned to the peripheral ignition spark gaps 13a and 14a of each of the first two cylinders, and the ignition coil 64 is assigned to the peripheral ignition spark gaps 13a and 14a of each of the second two cylinders. As shown, the high tension wires are grouped together for each group of ignition spark gaps which are sparked simultaneously. The groups of high tension wires are separated. The high tension wires assigned to the ignition spark gaps 13a and 14a are separately grouped for the first two cylinders and the second two cylinders.

Figure 16:
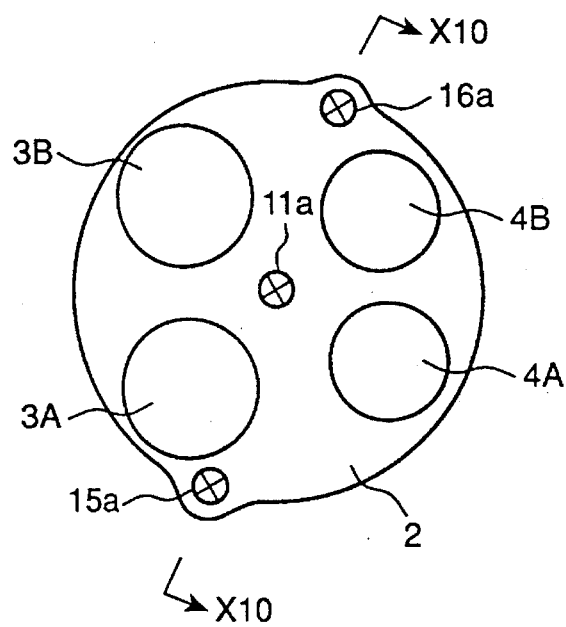
FIG. 16 is a schematic illustration showing an ignition spark gap arrangement in accordance with another preferred embodiment of the present invention.
Figure 17:
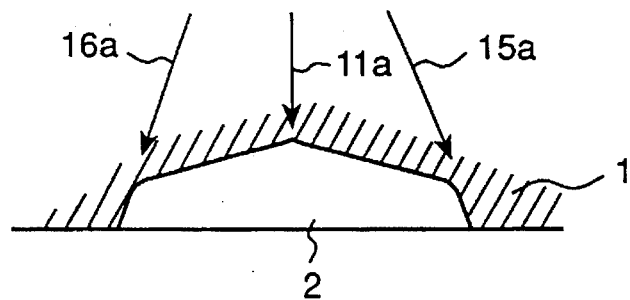
FIG. 17 is a cross sectional view of FIG. 16 along line X10—X10.
Figure 18:
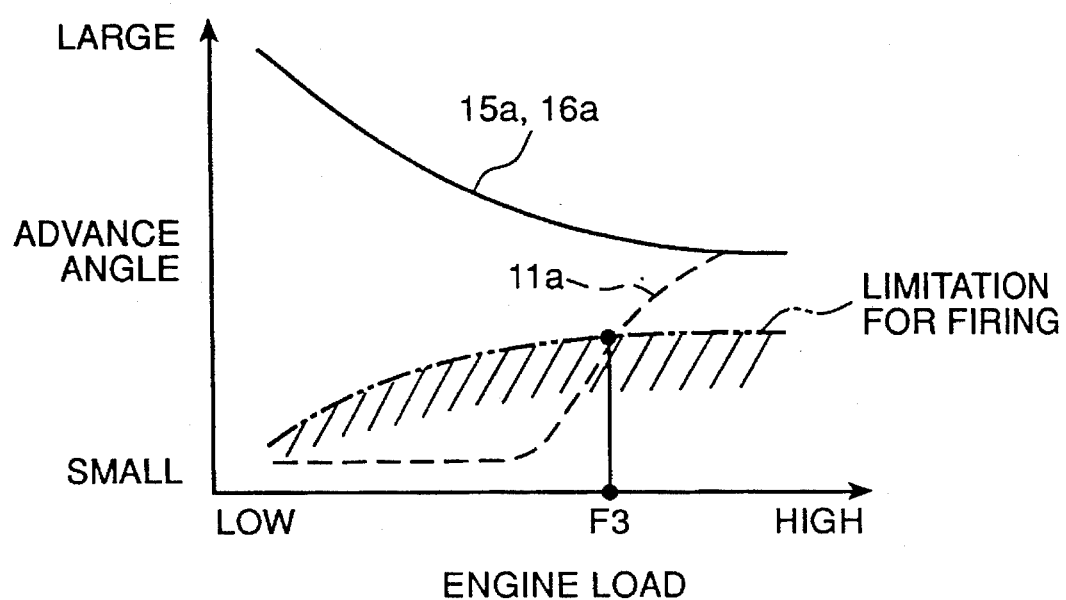
FIG. 18 is a diagram showing a relation between ignition timing and engine load for ignition spark gaps arranged as shown in FIG. 16.

FIGS. 16 and 17 show an ignition system in accordance with another preferred embodiment of the invention. In this embodiment, peripheral ignition spark gaps 15a and 16a are disposed in diametrically opposite positions. Spark plugs, having a center ignition spark gap 11a and the two peripheral ignition spark gaps 15a and 16a, respectively, are fitted in the cylinder head 1 and oriented as shown by arrows in FIG. 17. For these three ignition spark gaps 11a, 15a and 16a, engine loads are divided into two ranges for a first ignition mode, in which only the peripheral ignition spark gaps 15a and 16a are used to ignite fuel, and a second ignition mode, in which the center and peripheral ignition spark gaps 11a, 15a and 16a are all used to ignite fuel. For the first ignition mode, a lower range of engine loads is defined below a specific engine load F3. For the second ignition mode, a higher range of engine loads is defined above the specific engine load F3. Such is shown in FIG. 18.

Figure 19:
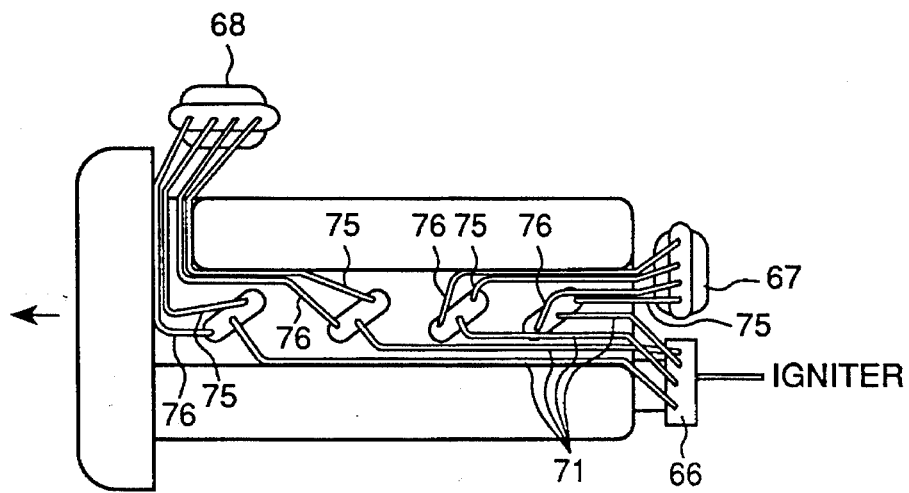
FIG. 19 is an illustration of high tension wiring for the ignition spark gap arrangement shown in FIG. 16.

FIG. 19 illustrates high tension wiring for the ignition system shown in FIG. 16 and 17. In the ignition system, a distributer 66 and ignition coil assemblies 67 and 68 are provided. The high tension wires for the ignition spark gaps 11a, 15a and 16a are designated by reference numbers 71, 75 and 76, respectively. This wiring configuration is designed based on the same concept as that adopted in the wiring configuration shown in FIG. 15.

Figure 20:
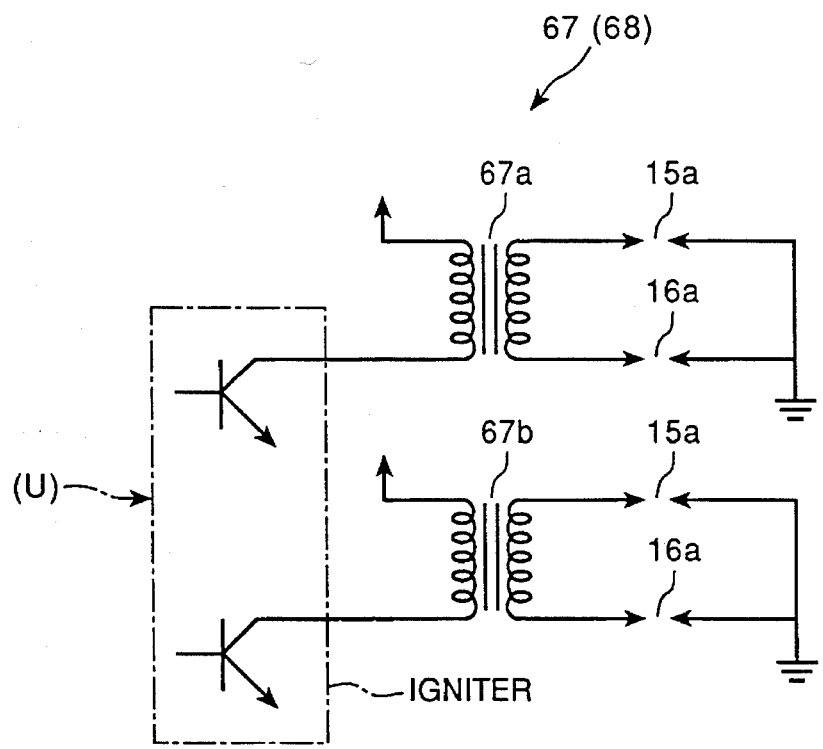
FIG. 20 is a diagram showing an ignition coil in detail.

FIG. 20 shows a wiring configuration between the ignition coil assembly 67 and the peripheral ignition spark gaps 15a and 16a. The ignition coil assembly 67 has two ignition coils 67a and 67b. One of the ignition coils 67a and 67b, for instance, the ignition coil 67a, is assigned to the peripheral ignition spark gaps 15a and 16a for a third cylinder. The other of the ignition coils, for instance, the ignition coil 67b, is assigned to the peripheral ignition spark gaps 15a and 16a for a fourth cylinder. The wiring between the ignition coil assembly 68 and the peripheral ignition spark gaps 15a and 16a is identical to the wiring shown in FIG. 20.

Figure 21:
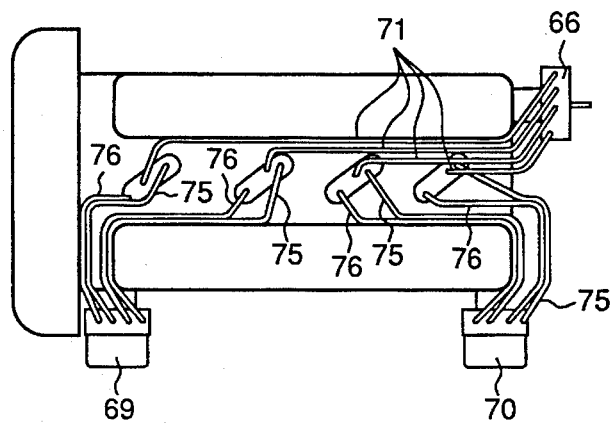
FIG. 21 is a variation of the high tension wiring arrangement shown in FIG. 18.

The wiring shown in FIG. 19 may be modified in such a way that all distributors 66, 69 and 70 are related to the ignition spark gaps for each of the cylinders as shown in FIG. 21.

Figure 22:
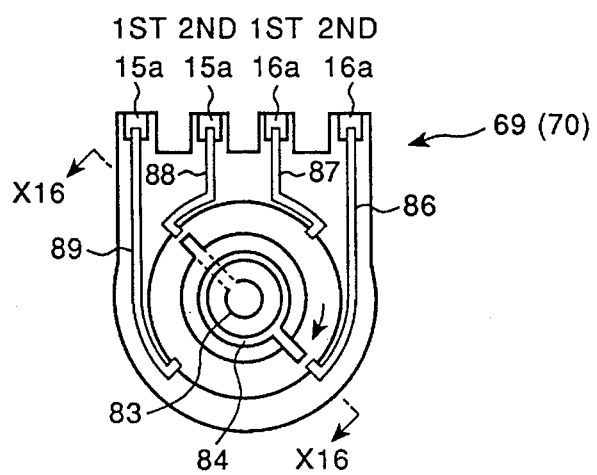
FIG. 22 is a plan view of a distributor shown in FIG. 21.
Figure 23:
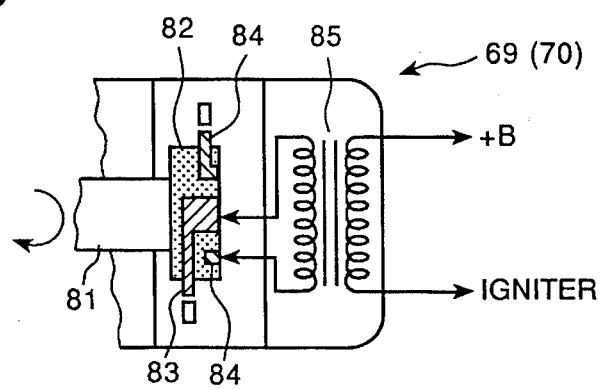
FIG. 23 is a cross-sectional view of the distributors shown in FIG. 22 along line X16—X16.

FIGS. 22 and 23 show, as an example, a distributer 69 or 70 for use in the system shown in FIG. 21. A rotary shaft 81, which is synchronized with the crankshaft, has an insulation disk 82 attached to the end thereof. The insulation disk 82 has a pair of power output terminals 83 and 84 arranged at diametrically opposite positions thereon. One of the power output terminals 83 and 84 is always connected to a positive terminal of a secondary winding of the ignition coil 85, and the other of the power output terminals 83 and 84 is always connected to a negative terminal of the secondary winding of the ignition coil 85. Around the insulation disk 82, four power input terminals 86, 87, 88 and 89 are provided. When the power output terminals 83 and 84 are brought into alignment with two of the four power input terminals 86–89, the peripheral ignition spark gaps 15a and 16a of the first cylinder or the second cylinder, connected to the power input terminals which are in alignment with the power output terminals 83 and 84, are simultaneously sparked with high voltage.

Figure 24:
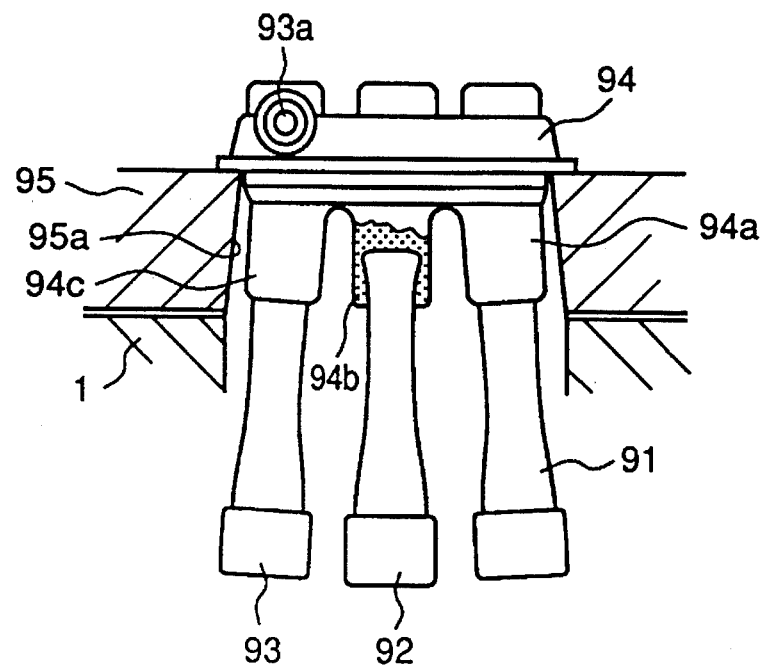
FIG. 24 is a schematic side view of a spark plug sealing structure.
Figure 25:
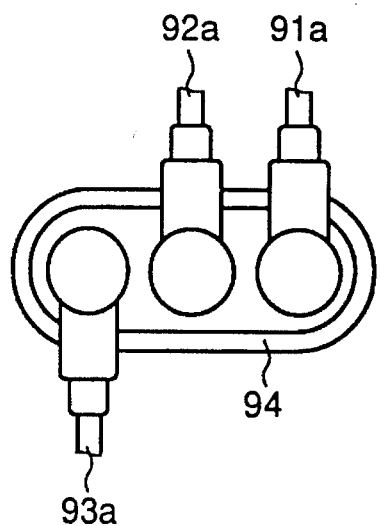
FIG. 25 is a top view of the structure shown in FIG. 24.

FIGS. 24 and 25 illustrate a sealing structure for sealing the ignition spark gaps 11a, 13a and 14a (shown in FIG. 1) or 11a, 15a and 16a (shown in FIG. 16) from the outside of the engine. In this structure, the spark plugs are provided with connecting caps 91, 92 and 93, respectively, detachably mounted on high voltage terminals thereof. The connecting caps 91–93 are made of plastic materials. A sealing cover 94, made of a material such as rubber, is formed with projections 94a, 94b and 94c extending downwardly therefrom. The sealing cover 94 covers a top opening 95a of a cylinder head cover 95 so as to integrally hold the connecting caps 91–93.

By means of the flexibility of the projections 94a–94c, the connecting caps 91–93 are oriented in different directions so as to be in alignment with the spark plugs, respectively. It is, of course, possible to extend high tension wires 91a–93a outside of the engine from the connecting caps 91–93 so that they pass through the sealing cover 94 as shown in FIG. 25.

Figure 26:
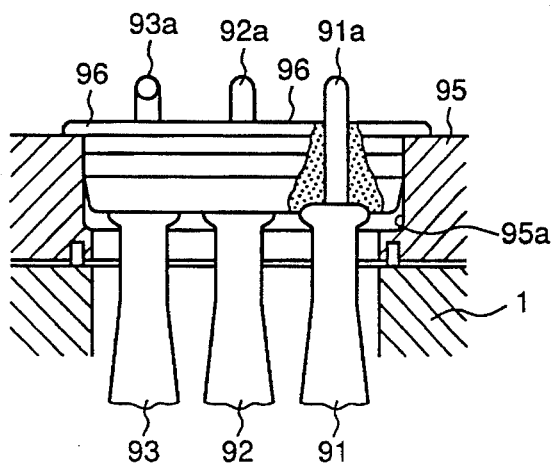
FIG. 26 is a schematic side view of another spark plug sealing structure.
Figure 27:
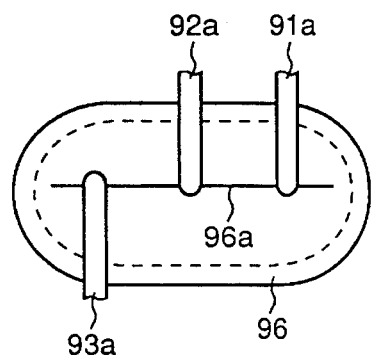
FIG. 27 is a top view of the structure shown in FIG. 26.

The sealing cover 94, shown in FIGS. 24 and 25, may be modified as shown in FIGS. 26 and 27. That is, as shown in FIGS. 26 and 27, a sealing cover 96, which is made of elastic material, such as rubber, is prepared separately from the connecting caps 91–93. The sealing cover 96 is formed, at its center portion, with a straight slit 96a so that the high tension wires 91a–93a extend outside of the engine from the connecting caps 91–93, passing through the center slit 96a, as shown in FIG. 27.

Figure 28:
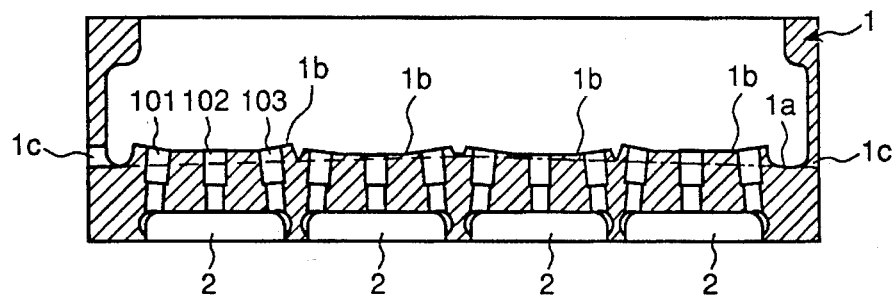
FIG. 28 is a schematic cross-sectional view of a water drain structure.

Referring to FIG. 28, another sealing structure is shown. In this structure, a seal is applied to plug fitting bores 101, 102 and 103 (which correspond to the plug fitting bores 21, 23 and 24 in FIG. 3, respectively). That is, the cylinder head 1 is formed with fitting faces 1b formed at a level which is higher that of than a middle deck 1a. A washer (not shown) is fitted to the fitting face 1b in order to attach and seal a spark plug. According to this sealing structure, water adhering on the fitting face 1b flows down onto the middle deck 1a, which is at a lower level than the fitting faces 1b, and is drawn outside of the engine block 1 through drain holes 1c.

Figure 30:
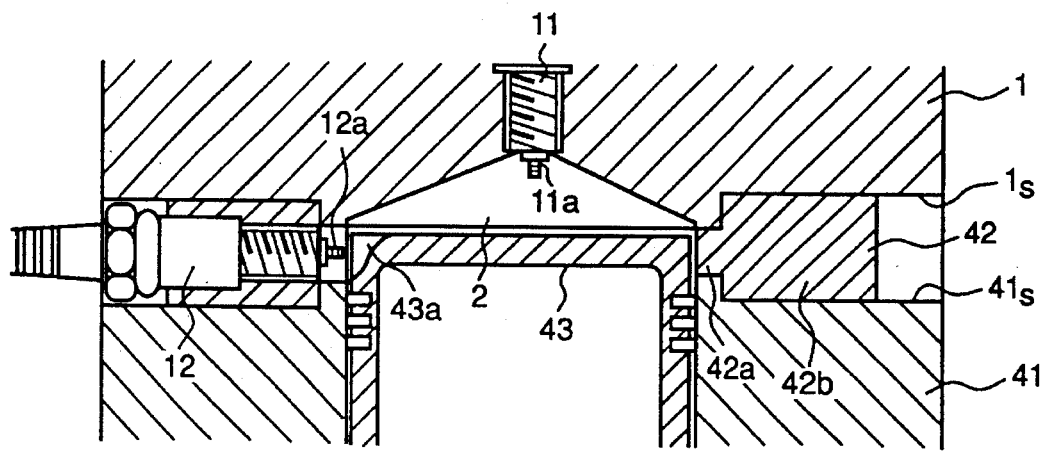
FIG. 30 is a vertical cross-sectional view of a cylinder head in which spark plugs are held by an annular ring.
Figure 31:
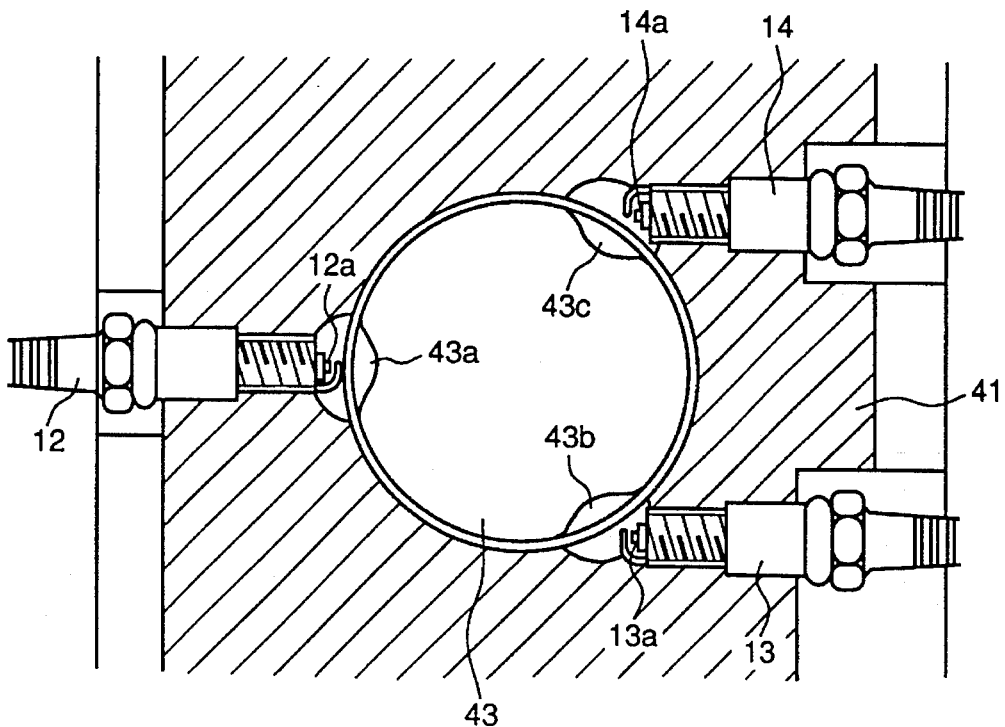
FIG. 31 is a horizontal cross-sectional view of the cylinder head of FIG. 30.

FIGS. 30 and 31 illustrate an ignition plug holding structure. An annular holding ring 42 is disposed between the cylinder head 1 and a cylinder block 41 so as to hold ignition plugs 12, 13 and 14 provided with the peripheral ignition spark gaps 12a, 13a and 14a, respectively. The annular holding ring 42 has an outer ring portion 42b and an inner ring portion 42a, having an axial thickness smaller than the outer ring portion 42b. The cylinder head 1 is formed with an annular stepped recess is opening downward. The cylinder block 41 is formed with an annular stepped recess 41s opening upward and corresponding to the annular recess 1s. During assembly of the cylinder head 1 and the cylinder block 41 into one block, the cylinder head 1 is mounted on the cylinder block 41 so as to air-tightly grasp the outer ring portion 42b of the annular holding ring 42 between the annular stepped recesses is and 41s. Inserting the annular holding ring 42 between the annular stepped recesses 1s and 41s allows the inner ring portion 42a to be made as thin as possible after consideration of the size of each ignition spark gap of the spark plug. This makes the height or thickness of the annular holding ring 42 exposed to the combustion chamber 2 sufficiently small so that a sufficiently high compression ratio can be obtained. The thickness or height of the inner ring portion 42a is made slightly larger than a maximum diameter of a nut of the spark plug 12 so as to allow the spark plug 12 to be threadingly fitted into the annular holding ring 42 from the outside.

A piston 43 in the cylinder block 41 is formed with notches 43a, 43b and 43c along a top shoulder thereof which meet the peripheral ignition spark gaps 12a, 13a and 14a, respectively, when the piston is near its top dead center position. These notches 43a, 43b and 43c permit flames, generated by the peripheral ignition spark gaps 12a, 13a and 14a, to propagate smoothly into the combustion chamber 2 therethrough. The ignition spark gaps 12a, 13a and 14a of the spark plugs held by the annular holding ring 42 are supplied with a high voltage by ignition coils provided for the respective spark plugs as shown in FIG. 29.

Figure 29:
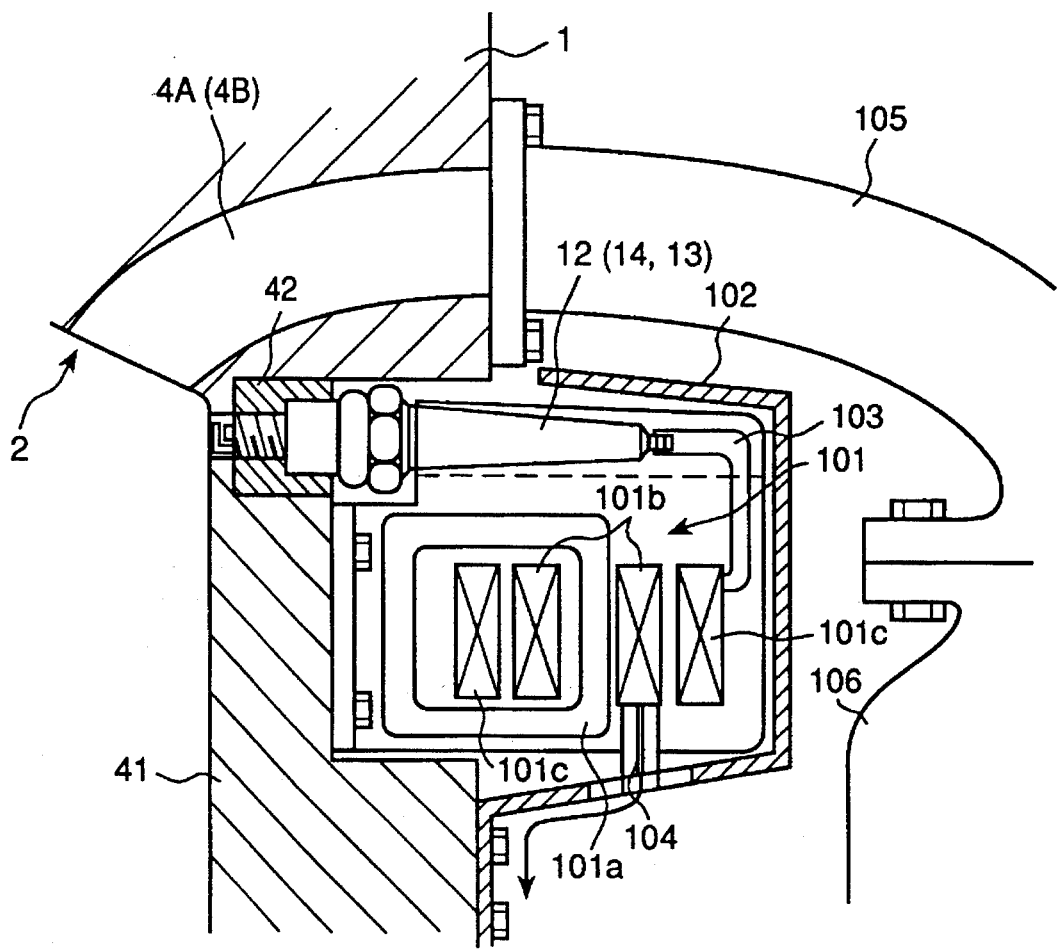
FIG. 29 is a schematic illustration of an ignition coil, one of which is provided for each ignition plug.

As is clear from FIG. 29, each ignition coil 101, including an iron core 101a, a primary winding 101b and a secondary winding 101c, is attached to the outer surface of the cylinder block 41 and is covered by an insulator 102. The insulator 102 prevents the ignition coil 101 from being adversely affected by exhaust heat from an exhaust pipe 105 having a catalytic converter device 106. A high tension wire and a primary current supply line from an igniter are indicated by numbers 103 and 104, respectively.

Figure 32:
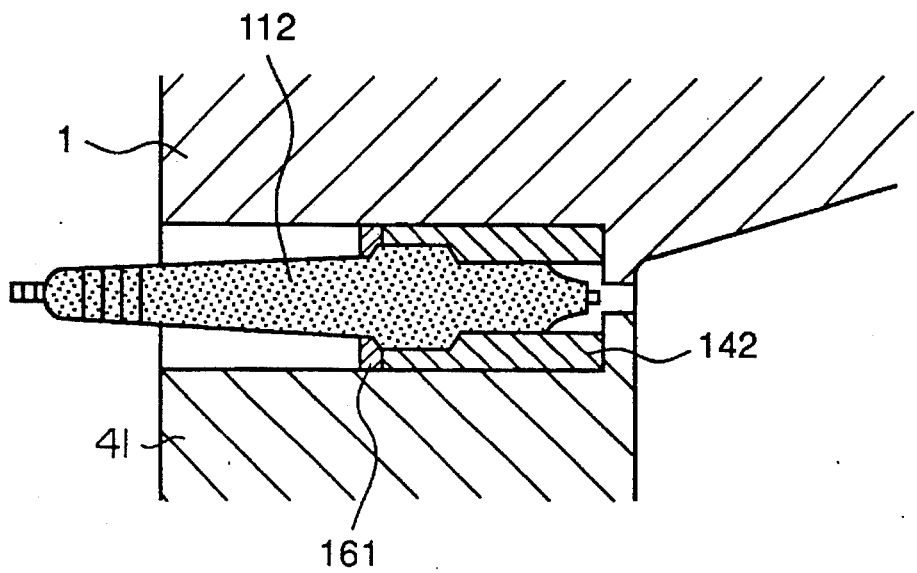
FIG. 32 is a vertical cross-sectional view of a cylinder head in which spark plugs are held by another annular ring.
Figure 33:
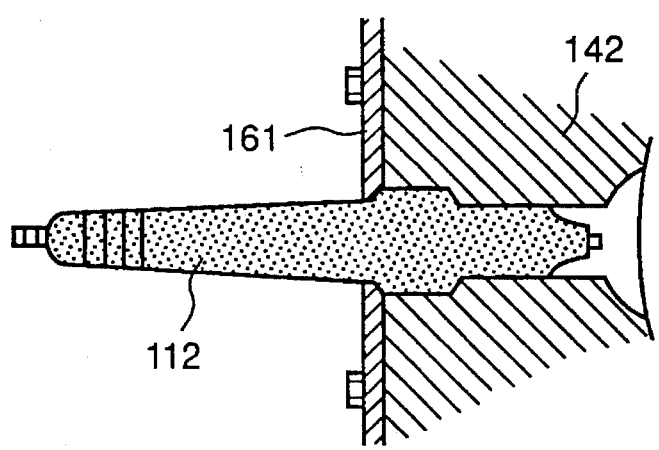
FIG. 33 is a horizontal cross-sectional view of the cylinder head of FIG. 32.

FIGS. 32 and 33 show an integral type of ignition plug holding structure. Each spark plug 112 is formed by an electrode and an insulator only and has no shell and nut. The spark plug 112 is retained in the annular holding ring 142 by a retaining plate 161. In a small space left between the spark plug 112 and the annular holding ring 142, a glass sealant is filled. To form the glass sealant, glass powder is filled in the space and melted. When the molten glass hardens, it firmly holds and seals the spark plug in the annular holding ring 142. Because of the integral holding structure of the spark plugs, if any one of the spark plugs is replaced, all the spark plugs 112 and the annular holding ring 141 must be replaced with another set of spark plugs 112 and annular holding ring 141.

It is to be understood that although specific embodiments of the present invention have been described, various other embodiments and variants may occur to those skilled in the art. Any such other embodiments and variants which fall within the scope and spirit of the invention are intended to be covered by the following claims.

What is claimed is:

1. An ignition system for an internal combustion engine having a plurality of combustion chambers, each of which is defined by a generally cylindrical inner wall, comprising:

a plurality of peripheral ignition spark gaps arranged at circumferential separations along said inner wall of each of said combustion chambers; and means for enriching a fuel and gas mixture between two adjacent peripheral ignition spark gaps separated by a circumferential distance which is larger than that between any other two adjacent peripheral ignition spark gaps.

2. An ignition system for an internal combustion engine having a plurality of combustion chambers, each of which is defined by a generally cylindrical inner wall, comprising:

a plurality of peripheral ignition spark gaps arranged at circumferential separations along said inner wall of each of said combustion chambers; and plug bores for receiving two adjacent peripheral ignition spark gaps separated by a circumferential distance which is larger than that between any other two adjacent peripheral ignition spark gaps;

wherein said plug bores are formed so as to direct flames produced by said two adjacent peripheral spark gaps toward a volume between said two adjacent peripheral spark gaps.

3. An ignition system for an internal combustion engine having a plurality of combustion chambers, each of which is defined by a generally cylindrical inner wall and formed with two intake ports arranged on one side of a center line passing through a center of the combustion chamber and two exhaust ports arranged on another side of said center line, comprising:

a plurality of peripheral ignition spark gaps arranger at circumferential separations along said inner wall of each of said combustion chambers, each of the plurality of peripheral ignition spark gaps extending into one of said combustion chambers a proper amount;

a center ignition spark gap disposed at the center of each of said combustion chambers; and ignition control means for selectively activating said center ignition spark gap and said peripheral ignition spark gaps according to engine operating conditions so that only said peripheral ignition spark gaps produce sparks in a first ignition mode and said center ignition spark gap and said peripheral ignition spark gaps all produce sparks in a second ignition mode, part of said inner wall of at least one combustion chamber having means for enhancing flame propagation applied between adjacent peripheral ignition spark gaps which have a circumferential separation larger than a separation between any other pair of adjacent peripheral ignition spark gaps, a first one of said peripheral ignition spark gaps being disposed between said intake ports, a second one of said peripheral ignition spark gaps being disposed on said other side between one of said intake ports and one of said exhaust ports adjacent to said one of said intake ports, a third one of said peripheral ignition spark gaps being disposed on said other side between another of said intake ports and another of said exhaust ports, and a circumferential separation between said second one of said peripheral ignition spark gaps and said third one of said peripheral ignition spark gaps being larger than any circumferential separation between both said first one of said peripheral ignition spark gaps and said second one of said peripheral ignition spark gaps and said first one of said peripheral ignition spark gaps and said third one of said peripheral ignition spark gaps, said means for enhancing flame propagation being disposed between said second one of said peripheral ignition spark gaps and said third one of said peripheral ignition spark gaps and is an enriched fuel and gas mixture.

4. An ignition system for an internal combustion engine having a plurality of combustion chambers, each of which is defined by a generally cylindrical inner wall and formed with two intake ports arranged on one side of a center line passing through a center of the combustion chamber and two exhaust ports arranged on another side of said center line, comprising:

a plurality of peripheral ignition spark gaps arranged at circumferential separations along said inner wall of each of said combustion chambers, each of the plurality of peripheral ignition spark gaps extending into one of said combustion chambers a proper amount;

a center ignition spark gap disposed at the center of each of said combustion chambers;

ignition control means for selectively activating said center ignition spark gap and said peripheral ignition spark gaps according to engine operating conditions so that only said peripheral ignition spark gaps produce sparks in a first ignition mode and said center ignition spark gap and said peripheral ignition spark gaps all produce sparks in a second ignition mode, and means for enhancing flame propagation in at least one combustion chamber comprising plug bores for receiving two of said peripheral ignition spark gaps and formed so as to direct flames produced by said two of said peripheral ignition spark gaps toward a volume between said two of said peripheral ignition spark gaps.

* * * * *